US005293298A

United States Patent [19]

[11] Patent Number: 5,293,298

Foglia

[45] Date of Patent: Mar. 8, 1994

[54] ELECTRICAL CONNECTOR

[75] Inventor: Henry R. Foglia, Raleigh, N.C.

[73] Assignee: International Business Machines Corporation, Armonk, N.Y.

[21] Appl. No.: 778,416

[22] Filed: Oct. 16, 1991

[51] Int. Cl.[5] .................. H02H 9/04

[52] U.S. Cl. .................. 361/113; 361/58; 361/111; 336/233

[58] Field of Search .................. 361/113, 111, 58; 336/233, 221, 175

[56] References Cited

U.S. PATENT DOCUMENTS

| | | | |
|---|---|---|---|
| 4,481,641 | 11/1984 | Gable et al. | 375/7 |
| 4,501,459 | 2/1985 | Chandler et al. | 339/48 |
| 4,808,843 | 2/1989 | Hedin | 361/113 |
| 4,846,731 | 7/1989 | Alwine | 439/651 |
| 4,885,747 | 12/1989 | Foglia | 370/123 |
| 5,053,910 | 10/1991 | Goldstein | 361/111 |
| 5,122,921 | 6/1992 | Koss | 361/111 |

FOREIGN PATENT DOCUMENTS

| | | |
|---|---|---|
| 0203013 | 5/1986 | European Pat. Off. . |
| 3326128 | 7/1983 | Fed. Rep. of Germany . |

*Primary Examiner*—Todd Deboer

*Attorney, Agent, or Firm*—Joscelyn G. Cockburn

[57] ABSTRACT

An improved electro/mechanical connector through which multi-media electrical signals are transported includes a first port with resilient contact tongues, a second port for supporting a coaxial assembly and a third port coupled to a circuit module which receives the multi-media electrical signals on an input terminal splits the multi-media electrical signals into broadband signals which are routed to the coaxial assembly and baseband signals which are routed to the first port. The circuit module also receives broadband signals and baseband signals from the coaxial assembly and first port respectively combines them into the multi-media signals which are outputted on the input terminal.

14 Claims, 8 Drawing Sheets

ELECTRICAL CONNECTOR

BACKGROUND OF THE INVENTION

1. Field of the Invention

The invention relates to electrical couplers and connectors in general and, in particular, to electrical couplers and connectors used in multi-media communication networks.

2. Cross Reference to Related Patent

U.S. Pat. No. 4,885,747, titled "Broadband and Baseband LAN," issued on Dec. 5, 1989, assigned to the assignee of the present invention discloses a multi-media communications network. A device called an F-coupler combines and separates broadband and baseband signals. The present invention discloses an improved F-coupler.

3. Prior Art

The use of electrical couplers and connectors in communications networks is well known in the prior art. Broadly speaking, prior art electrical couplers may be used as electrical splitters or combiners. If used as a splitter, the electrical coupler separates an electrical signal so that it traverses multi paths. If used as an electrical combiner, the coupler combines electrical signals so that it traverses fewer paths. The electrical connector attaches data terminal equipment (DTE) to the communications network. As a result, the DTE inserts electrical signals into the network or receives electrical signals from the network.

U.S. Pat. No. 4,472,691 (Kumar et al) discloses a coupling device which produces a plurality of outputs from a single RF source.

U.S. Pat. No. 4,419,636 (Hong Yu) discloses a low frequency wide band signal coupler which provides bidirectional signal transmission between a controller and a terminal. The coupler can be used as a splitter (signal divider) or signal tap device.

U.S. Pat. No. 3,925,737 (Headley) discloses a signal coupling apparatus which couples radio frequency signals from a primary transmission path to two or more secondary transmission paths.

U.S. Pat. No. 3,566,275 (Schenfeld) discloses a signal splitting circuit which delivers a radio frequency signal and a common DC voltage to a plurality of terminals.

U.S. Pat. Nos. Re. 32,760 (Chandler) and 5,030,114 (Carey et al) disclose connectors with hermaphroditic mating members. Each of the hermaphroditic mating members has a mating face with spaced resilient tongues which contact like resilient tongues of the other member when the connector is in mating relationship and contact shortening members, placed in each of the mating members, when the members are separated.

The above described prior art devices (couplers and connectors) work well in the communications network in which a single type of information is transmitted. Usually, the single type of information is restricted or uses a single sector of the frequency spectrum. For example, most of the above couplers split or combine radio signals which are restricted to the frequency spectrum used to transmit radio signals. However, the newly emerging multi-media technology which transmits multiple types of information (voice, video, data, etc.) on a single transmission media (wire, fiber optic, etc.) uses different sectors of the frequency spectrum and, in that respect, the prior art devices are not suited for the multi-media environment.

SUMMARY OF THE INVENTION

It is the general object of the present invention to provide an interconnecting device herein after called an F-Coupler for use in a multi-media communications network.

It is another object of the present invention to provide an F-Coupler which is practical, easy to manufacture and low in cost.

These and other objects are achieved by mounting in a single housing connecting sections or ports and a coupler section. The connector sections attach the data terminal equipments to the multi-media communications network. The coupler section provides signal splitting functions, signal combining functions and lightening protection functions.

In particular, the F-coupler includes a circuit support card on which a pair of transformers are mounted. Each transformer is formed from a pair of multi-holed cylindrical ferrite cores threaded with multi-wire windings. A first circuit arrangement which terminates signals in selected frequency bands and provides lightening protection is connected to one end of selected wires of the multi-wired windings. The other end of the selected wires are coupled to selected ones of a plurality of resilient contact tongues. A second circuit arrangement for terminating signals in another frequency spectrum and provide lightening protection is connected to one end of another wire of the multi-wire windings. The other end of the other wire is coupled to a broadband terminal to which a coaxial cable may be connected. Preferably, the transformers and circuit arrangements are enclosed by a metal shield box. Another entry/exit port is provided on the circuit support card. Therefore, the F-coupler has three entry/exit ports with one port providing attachment for baseband utilization devices, a second port providing attachment for broadband utilization devices and the third providing attachment to the network.

The foregoing features and advantages of the invention will be more fully described in the accompanying drawings.

DETAILED DESCRIPTION OF THE PREFERRED EMBODIMENT

Figure 1:
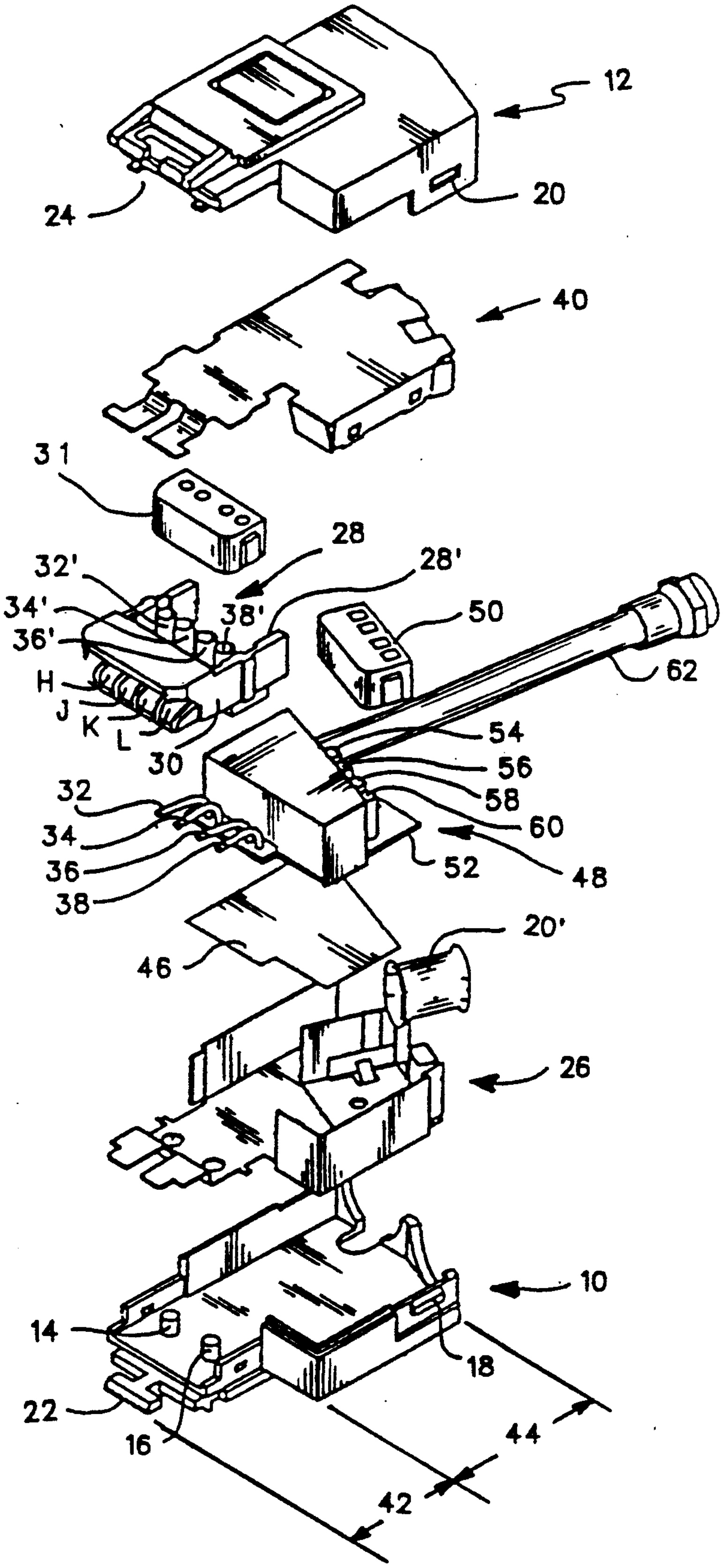
FIG. 1 is an exploded perspective view of the improved F-coupler connection according to the teachings of the present invention.

FIG. 1 shows an exploded view of the improved F-coupler according to the teachings of the present invention. The F-coupler can be used in a multi-media communications network such as the one described in the above-referenced U.S. Pat. No. 4,885,747. As such, the referenced patent is incorporated herein and can be used in any situation to supplement the disclosure of the present invention. The F-coupler includes a common housing formed from bottom cover 10 and top cover 12. The top and bottom covers are molded from non-conductive material such as hard plastic. The bottom cover 10 is fitted with a pair of upstanding posts 14 and 16 which coact with alignment holes in other components of the F-coupler. A pair of latching members, only one of which is shown and identified as element 18 on one side of the bottom cover, coacts with a pair of openings positioned on either side of the top cover 12, one of which is identified by numeral 20, to latch the bottom cover to the top cover. A latching mechanism formed by components 22 and 24 coact with a similar mechanism on another connector to hold the resilient tongues (details to be given hereafter) when the F-coupler mates with another hermaphroditic connector.

Still referring to FIG. 1, the F-coupler further includes a bottom shield assembly 26. The bottom shield assembly is fabricated from metal and has a rear portion with upstanding side walls and an opening in the side walls to receive a ferrule 20' through which a data cable (details to be given hereinafter) is fitted. The size of the opening is such that when the ferrule is inserted in the orientation shown in FIG. 1, the ferrule is snugly fitted within the opening. A pair of holes are positioned in the front section of the bottom shield assembly. The holes coact with upstanding posts 14 and 16 to position the bottom shield assembly within the bottom cover member 10. A housing plug subassembly 28 carries a pair of holes (not shown) in the terminal block section 30 which coact with the mounting posts 14 and 16 to position the housing plug assembly so that the resilient contact tongue is able to coact with like contact tongues on a mating connector. A stuffer cap 31 is provided with an extended member which coacts with grooves in the terminal block section 30 to force conductors 32', 34', 36' and 38' into terminal blocks 32A, 34A, 36A and 38A. It should be noted that the terminal blocks are provided with grooves, not shown, which cut into the plastic cover of the conductors to make contact with the conductor wires. It is worthwhile noting that when the bottom shield assembly 26, the housing plug assembly 28, top shield assembly 40 and top cover 12 are aligned in, an assembled fashion, the front section of the F-coupler, identified by numeral 42 (see also FIG. 5), form a hermaphroditic exit/entry port of the F-coupler. This hermaphroditic entry/exit port is substantially similar to the like port described in the connector set forth in U.S. Pat. No. Re. 32,760 and U.S. Pat. No. 5,030,114. Both patents are incorporated herein by reference and should be used for detailed description of the hermaphroditic port.

Still referring to FIG. 1, the rear section of the F-coupler identified by numeral 44 includes insulator 46, F-module 48 and stuffer cap 50. The F-module 48 includes the electrical circuit which splits or combines the broadband and baseband signal. The insulator 40 insulates the F-module from the bottom shield assembly 26. Details of the F-module 48 will be given subsequently. Suffice it to say at this time that the F-module has a circuit card 52 for mounting the electrical components (to be described subsequently). A plurality of barrel connector 54, 56, 58 and 60 are mounted to the card. As will be explained subsequently, the conductors which are carried in cable (FIG. 5) are fitted into stuffer 50 which, in turn, forces the conductors into the barrel connectors. A coaxial assembly 62 for carrying broadband signals such as video, etc., is fitted in electrical communications with the component on the circuit card. Likewise, a plurality of conductors 32, 34, 36 and 38 are connected to selected ones of the component. As stated previously, conductors 32, 34, 36 and 38 are forced by stuffer cap 32 into barrel terminals 32', 34', 36' and 38A. The conductors also form the windings of the transformers (to be described hereinafter). Thus, it can be seen that the F-coupler has three exit/input terminals formed by coax assembly 62, the resilient contacts H, J, K, and L and the entry/exit point form by barrel connectors 54, 56, 58 and 60. It should also be noted that the top shield assembly 40 has downwardly extending side members with openings which coact with locking mechanism (not shown) in the upstanding side walls of the bottom shield assembly 26 to form a closed EMI shield.

Figure 5:
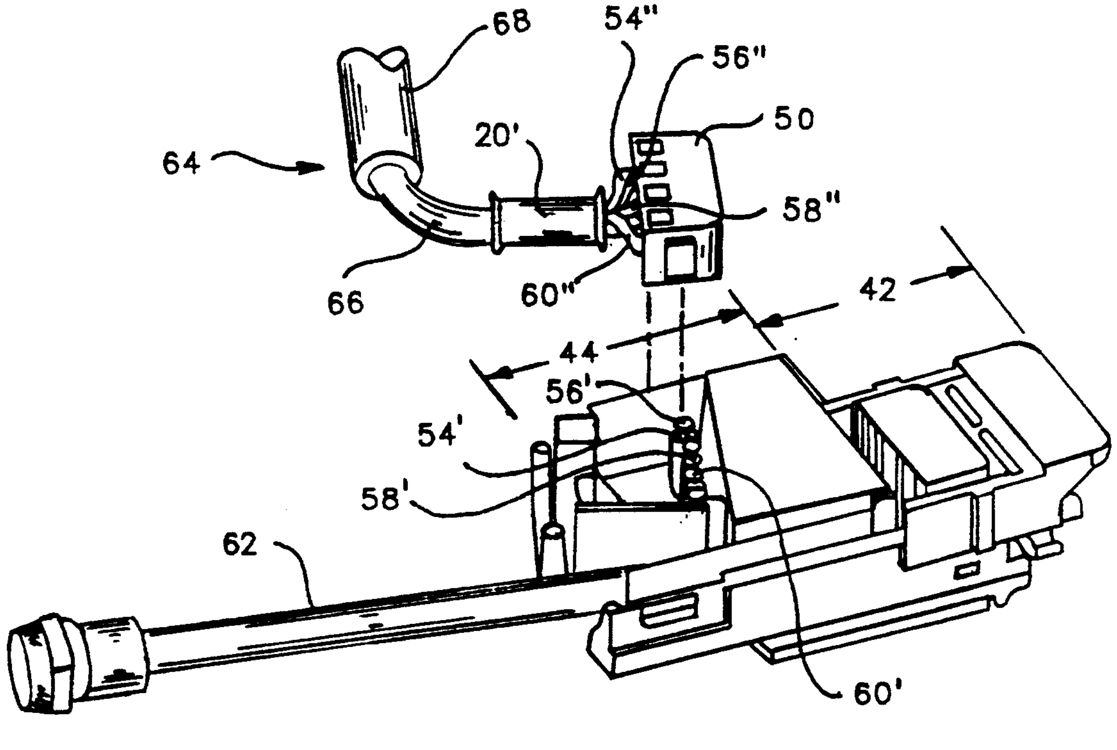
FIG. 5 is a perspective view of the F-coupled with cable lead out port, coaxial lead out port and hermaphroditic lead out port.

Turning to FIG. 5 for the moment, there is shown an assembled F-coupler. In order to show the internals of the assembled F-coupler, the top shield assembly 40 and a top cover 12 (FIG. 1) are not shown. Also, the orientation of the F-coupler shown in FIG. 5 is the reverse of the orientation shown in the disassembled F-coupler shown in FIG. 1. In FIG. 1, the front section 42 of the disassembled F-coupler is pointing towards the left-hand side of the page, whereas in FIG. 5, the front section 42 is pointing towards the right-hand side of the page and the rear section 44 is pointing towards the left edge of the page. To fully assemble the F-coupler shown in FIG. 5, a cable assembly 64 is connected to the barrel connectors 54', 56', 58' and 60'. It should be noted that these barrel connectors are identical to the one shown in FIG. 1 and attached to circuit card 52. The prime (') designation is used to indicate that they are shown in a different figure. The cable assembly 64 is connected to the communications network (not shown) to which the F-coupler is connected. The wire conductors 54'', 56'', 58'' and 60'' mate with respective ones of the barrel connectors.

Still referring to FIG. 5, in the preferred embodiment of this invention, cable 64 is the IBM® Data Cable Assembly. This data cable assembly comprises four color coded conductors 54'', 56'', 58'' and 60''. Each pair of the color coded conductors are used to transmit signals bidirectionally. Stated another way, one pair of the color-coded conductor transmits signals into the F-coupler and the other pair transmits signals out of the F-coupler. The color coded conductors are wrapped in conductive sheath 66 which is also wrapped in a plastic cover 68. Each of the color coded conductors are also wrapped with a plastic cover. In the final assembly shown in FIG. 5, a portion of the outside plastic cover 68 is removed from the cable and the ferrule 20' (FIG. 1) is slipped over the sheathing 66. The sheathing is stripped back to lie on the ferrule and the plastic covered conductors are placed into stuffer cap 50. The stuffer cap is then forced over the barrel connectors as is shown by the dotted line and the slits in the barrel connector pierce the plastic cover on each conductor to make contact between the conductor and the respective barrel connector. The sheathing which is now in contact with the ferrule is forced into the ferrule opening in the bottom shield assembly 26 (FIG. 1) to form a continuous conductive plane between the sheathing the ferrule and the shield assembly of the F-coupler. With the cable assembly 64 firmly in place, the top shield assembly 40 is slid into the bottom shield first, then the top cover assembly 12 and the structure is fitted over the F-Coupler. As stated previously, the holes in the top shield assembly 40 coact with protruding members on the upstanding side of bottom shield assembly 26 to form a closed EMI chamber. Also, the opening 20 in the top cover coacts with the raised member 18 on the bottom cover to form a housing encircling the components of the F-coupler.

With reference to FIGS. 1 and 5, in assembling the F-coupler, the insulator member 46 is placed in the rear section of bottom shield assembly 26. The F-module 48 is placed on top of the insulator 46. The orientation of the F-module in the bottom shield assembly 26 is such that the barrel connectors 54, 56, 58 and 60 face the right-hand side of the page, while the coded conductors 32, 34, 36 and 38 face the left-hand side of the page. The bottom shield assembly 26 is then placed in the bottom cover 10 so that the holes in the front section of bottom shield assembly is fitted over posts 14 and 16. The housing plug assembly 28 is next positioned in the front section 42 of bottom cover 10. As stated previously, alignment holes, not shown, are positioned within the terminal support block 28'. The holes coact with posts 14 and 16 to align the housing plug assembly so that the resilient tongues (H, J, K, L) are positioned to coact with similar tongues in a mating connector as described above and shown in U.S. Pat. Nos. 5,030,114 and Re. 32,760. The coded conductors 32, 34, 36 and 38 are fitted into stuffer cap 31 which is forced into support block 28'. As a result, the conductors are forced into contact with the barrel connectors.

Figure 6:
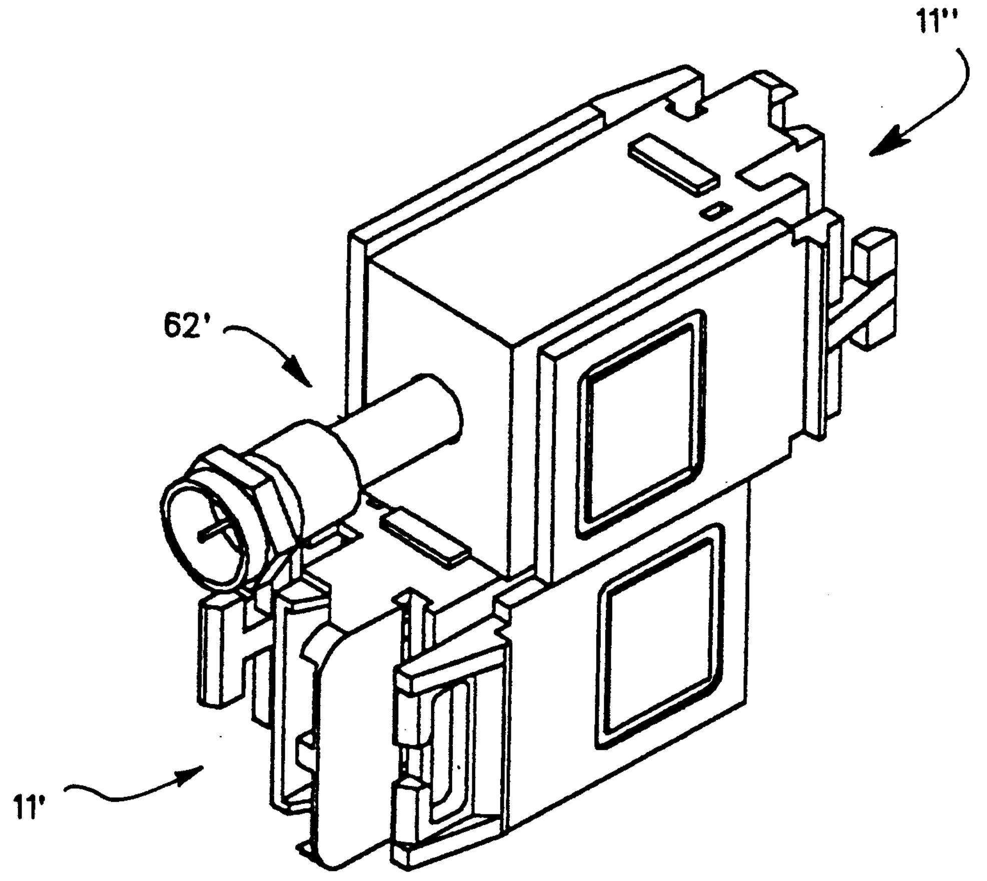
FIG. 6 shows a perspective view of an alternate embodiment of the F-Coupler.

FIG. 6 shows a perspective view of an alternate embodiment of the F-Coupler. The alternate embodiment has a broadband entry/exit port to which a coax cable assembly 62' is connected and could be used to attach broadband devices. The alternate embodiment further includes hermaphroditic exit/entry ports 11' and 11'', one of which could be connected to baseband devices via a mating connector and the other could be coupled via a mating connector to a communications network transferring multi-media electrical signals. The hermaphroditic exit/entry ports are identical to the one previously described. Therefore, the details of the ports will not be repeated. In addition, the functional characteristics of the internal components of the alternate embodiment are substantially similar to those of the embodiment set forth in other views of the drawings and described in other parts of the specification. The coax 62' could be a female F-connector barrel mounted on PC board 52.

Figure 2A:
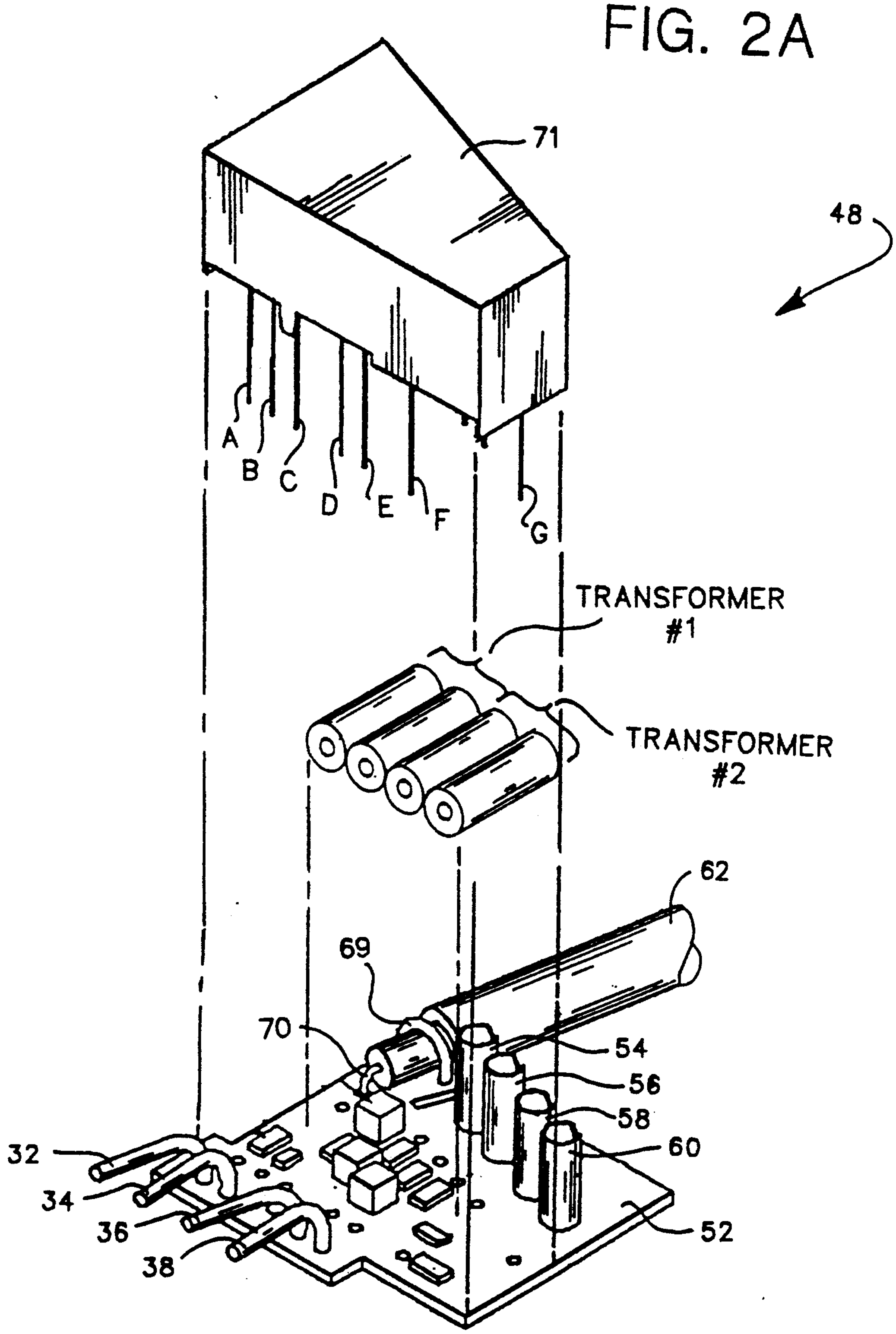
FIG. 2A is an exploded perspective view of the F-coupler module.

FIG. 2A shows an exploded view of the F-module 48 of FIG. 1. For brevity, components which are common to components in other views of the drawings are identified by common numerals. The F-module includes card 52 on which barrel terminals 54, 56, 58 and 60 are mounted. As stated before, each of the barrel terminals has a slot with sharp edges that pierce the insulation of a conductor that is forced into the barrel terminal. The card 52 has a plurality of through holes through which conductors are threaded to make contact with electrical conductors or lands (not shown) disposed on the card. Color coded conductors 32, 34, 36 and 38 are threaded through a set of holes on card 52 and make contact with lands on the underside of the card. A plurality of surface mounted electrical circuit components (details to be given subsequently are mounted on the top surface of the card. In FIG. 2A, these surface mounted electrical components are shown as rectangular blocks. The braid and non-conductive covering on coax assembly 62 is trimmed back as is shown in FIG. 2A and a cable retention half ring 69 is soldered to the braid and anchors the coax assembly to the card. The cable retention half ring is in contact via the braid with the PCP or non-conductive portion of the coax assembly which shields the inner conductor 70. The inner conductor 70 is forced through a hole on the card to make contact with an appropriate land pattern on the underside of the card 52. The transformer shield box 72 which houses the transformer (details to be given hereinafter) is next fitted on an appropriate area of the card. The coded wires emanating from the transformer and identified by alphabetical characters A, B, C, D, E, F, . . . G are threaded through appropriate holes on the card to make contact with selective land patterns on the underside of the card. It should be noted that when the structure is completed, the components including the transformers (to be described subsequently) are totally encircled by the transformer shield box and only coded conductors, coax cable assembly and barrel terminals are shown (see FIG. 1).

Figure 2B:
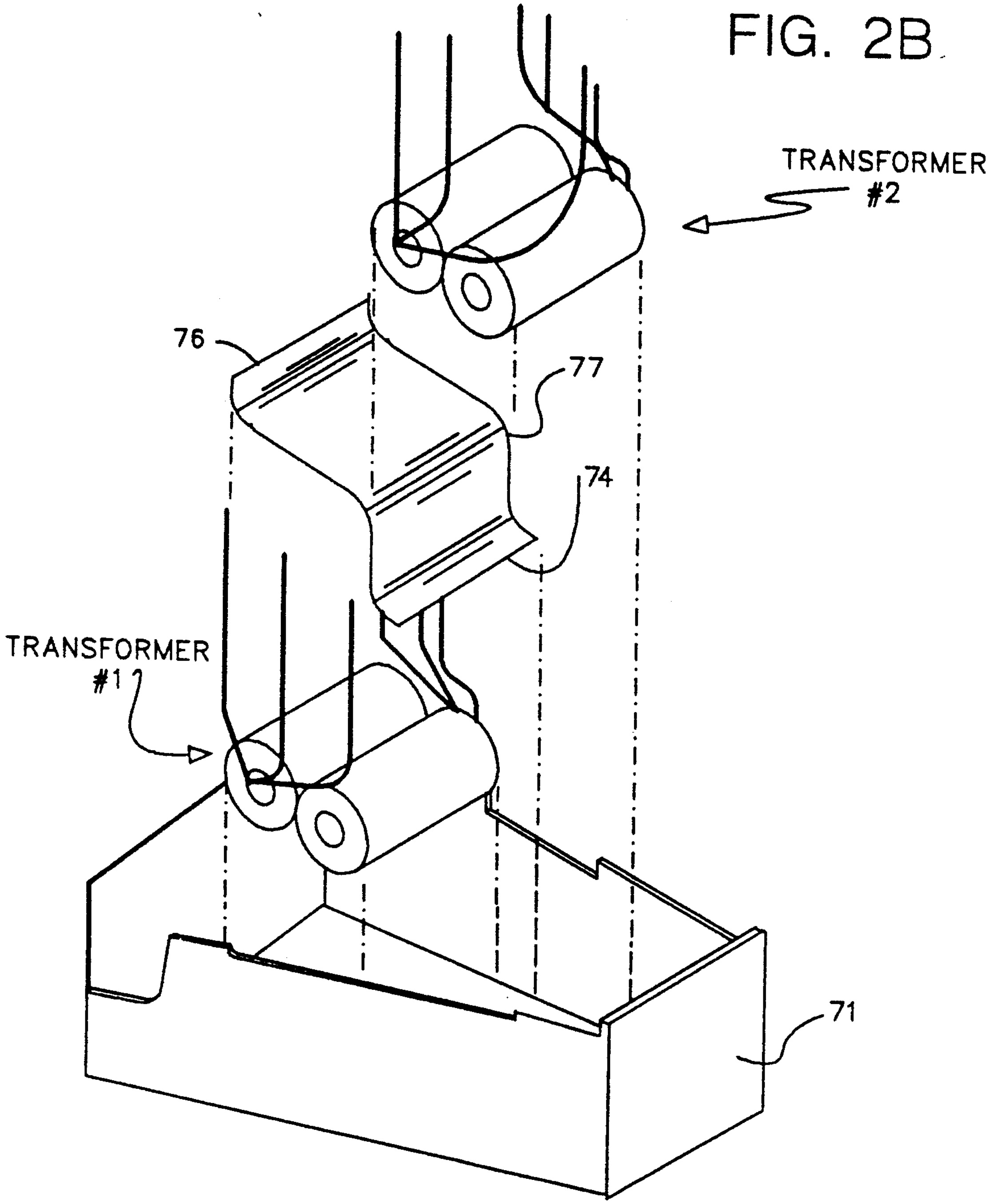
FIG. 2B is an exploded perspective view of the shield box and components to be assembled therein.

FIG. 2B shows the shield box and the components which are assembled in the shield box. The shield box 71 is fabricated from solid conductive material such as nickel coated brass. Two transformers #1 and #2 are positioned in the shield box. Details of the transformers will be given subsequently. Suffice it to say at this point that each of the transformers comprises a pair of cylindrical members with wires emanating from each of the cylindrical members. A foil tape 77 is placed around one pair of the transformer and is soldered at solder point 74 and 76 to the bottom and side of shield box 71. As should be evident at this point, when the transformers and foil tape are assembled in the shield box and the shield box is turned over as is shown in FIG. 2A, the items A, B, C, . . . represent the wires extending from the transformer.

Figure 2C:
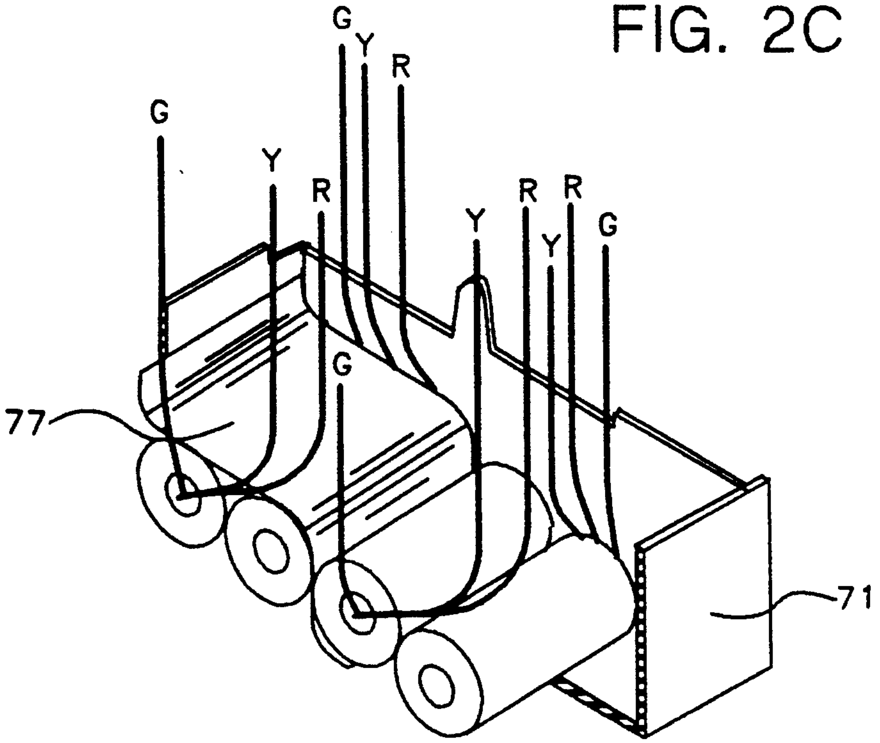
FIG. 2C is an exploded perspective view of a shield box and assembled components.

Turning to FIG. 2C for the moment, a cut-away view shows the positioning of the transformer in the shield box. As is shown in the figure, one of the transformers is covered with foil tape 77 and the other is not. The foil tape provides a first level of shielding for the signal passing through the covered transformer. A second and third level of shielding is provided by the shield box 71 and shield assemblies 26 and 40 (FIG. 1). Both transformers are fastened to the bottom surface of the shield box. Even though a plurality of techniques and/or adhesive can be used for fastening the transformer to the shield box in an embodiment of the present invention, an adhesive called Loctite 495 or GE RTV 162 was used. The transformers are placed so that the wires are orientated as shown in the cut-away view. The respective letters on each of the wires identify the color of the wire. This coloring representation allows someone who is not very skilled to assemble and interconnect the various wires with selective points in the F-coupler. In this figure, G represents Green, Y represents Yellow, and R represents Red. It should be noted that other color schemes can be selected without departing from the scope of the present invention.

Figure 2D:
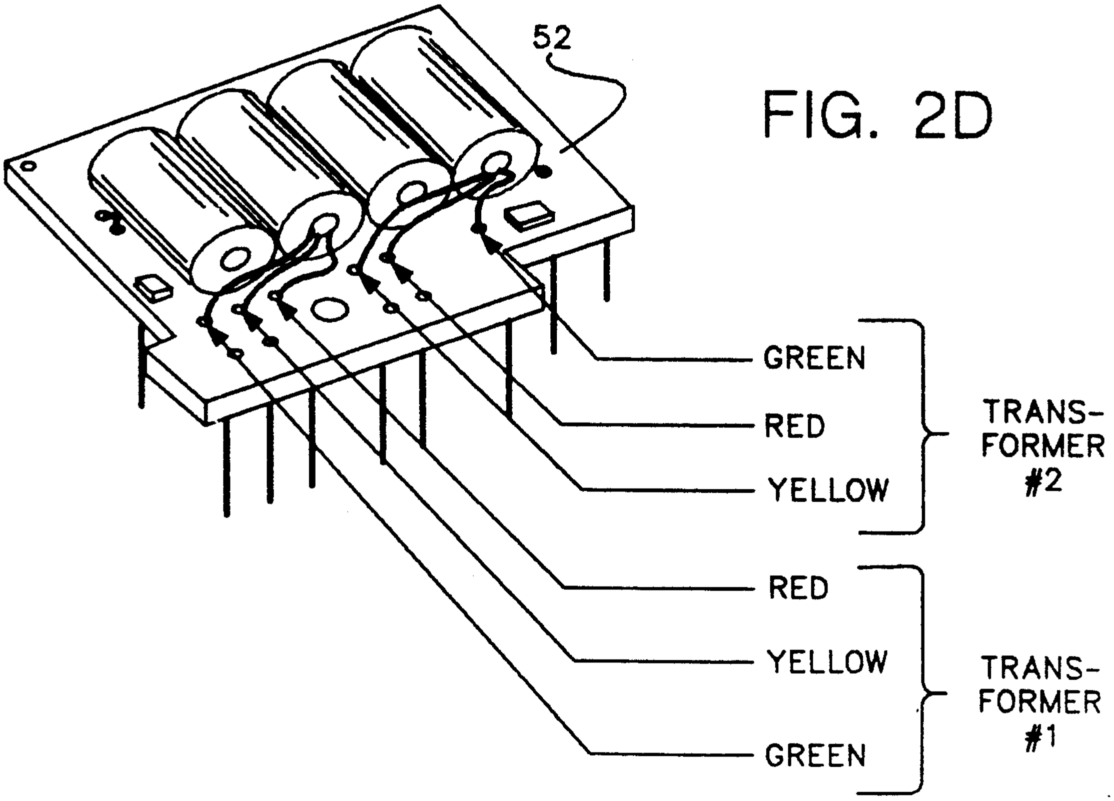
FIG. 2D shows the transformer wiring to the circuit board.

Turning to FIG. 2D for the moment, the orientation of the transformers relative to circuit card 52 is shown. In the embodiment, components on the circuit card are removed for clarity. As can be seen, the respective wires from the transformer are threaded through holes in the circuit card. As stated before, the holes allows access to printed circuit conductors mounted on the underside of the circuit card.

Figures 3A, 3B:
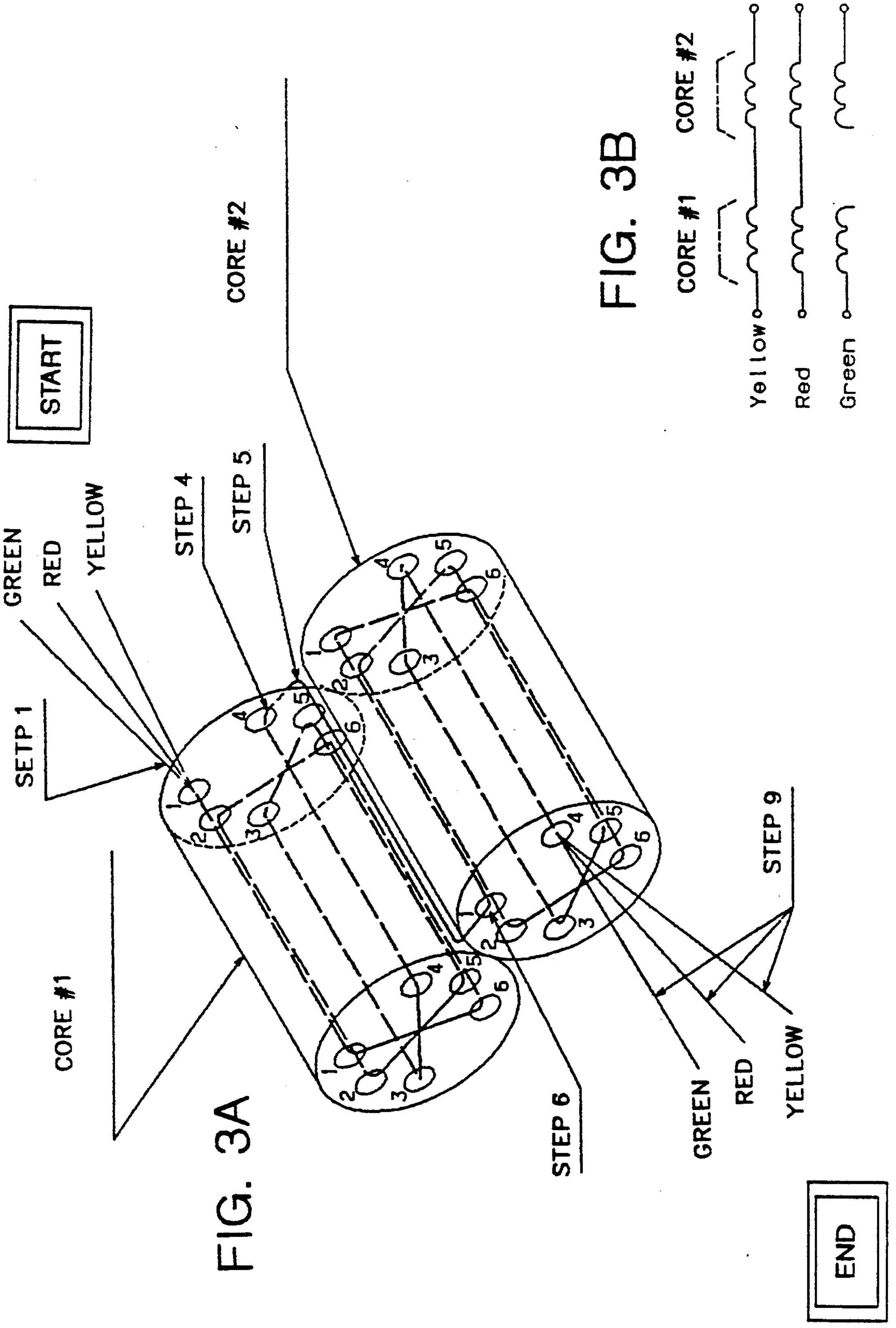
FIG. 3A shows a schematic of the multi-hole ferrite transformer.
FIG. 3B shows a schematic of the windings.

FIG. 3A shows a schematic of one of the transformers and how it is wound. Both transformers are identical so the teaching to be given subsequently is applicable to either of the transformers. The transformers are fabricated from two ferrite cores, core #1 and core #2, which are cylindrical and are joined together along the respective cylindrical surfaces. Although different methods or adhesives can be used for joining the cores, in one embodiment of this invention, an adhesive called Loctite 495 was used. Even though ferrite cores having different dimensions and/or characteristic can be used, in one embodiment of this invention, a ferrite core, P/N 2664666611 manufactured by Fair-Rite Products Corp. was used with good results.

Each core is solid and a plurality of elongated holes are bored through the ferrite. The holes are parallel and extend along the longitudinal axis of each core. In one embodiment of this invention, six 10 millimeter holes were provided in each of the cores. The holes are positioned and orientated as in shown in the figure. Each hole extends from the end of the core labeled start and finishes at the other side of the core labeled end. Also, each hole is labeled by the same numeral at the start side of the core and at the end side of the core. Thus, the hole labeled 1 in core 1 has a beginning at the start side of the core and finishes at the end side of the core. Likewise, the hole labeled 2, 3, etc. For proper operation of this transformer, it is important to follow specific steps in winding the core with the wires. Three color wires are used for winding the core. The wires are green, red and yellow. It should be noted that the colors are used so that making appropriate connections in the F-coupler is relatively easy. However, the colors are of no moment in affecting the operation of the transformer. In winding the transformer, it is preferred that the winding begin in core 1 at the end which is identified as start end. The steps and the hole through which the three wires must be threaded is also identified in the figure. The winding sequence is as follows:

Step 1) insert all wires into "start" side of hole #1. Pull wires through, leaving approximately two inches exterior to the core at the start side. Loop the wires back through hole #6 on the opposite surface (that is, the end side of the core).

Step 2) loop wires through hole #2 and back through hole #5.

Step 3) loop wires through hole #3 and back through hole #4.

Step 4) cut green wire flush with core #1 as it exits hole #4 to prevent shorting to shield box 71.

Step 5) pull the wires over the top of the cores (in the crease between the two cores) so that winding of core #2 begins on the "end" side.

Step 6) feed all three wires through hole #1 and back through hole #6. Cut green wire flush with core #2 as it enters hole #1.

Step 7) loop wires through hole #2 and back through hole #5.

Step 8) loop wires through hole #3 and back through #4.

Step 9) wires should be exiting hole #4 on the end side. Trim leads so 50 millimeters (approximately 2") exit from hole on the end side of core #2.

In summary, it should be stated that the wires enter hole #1 (core #1 on the start side) and exit the transformer in hole #4 of core #2.

FIG. 3B shows a schematic of the transformer windings. As can be seen from the schematic the yellow and red wires are continuous through core #1 and #2, while the green wire is non-continuous. This non-continuous feature of the wiring is needed to form the broadband RF coupling for the F-coupler, to the neighboring wire pairs and to effect wide band coupling.

Figure 4:
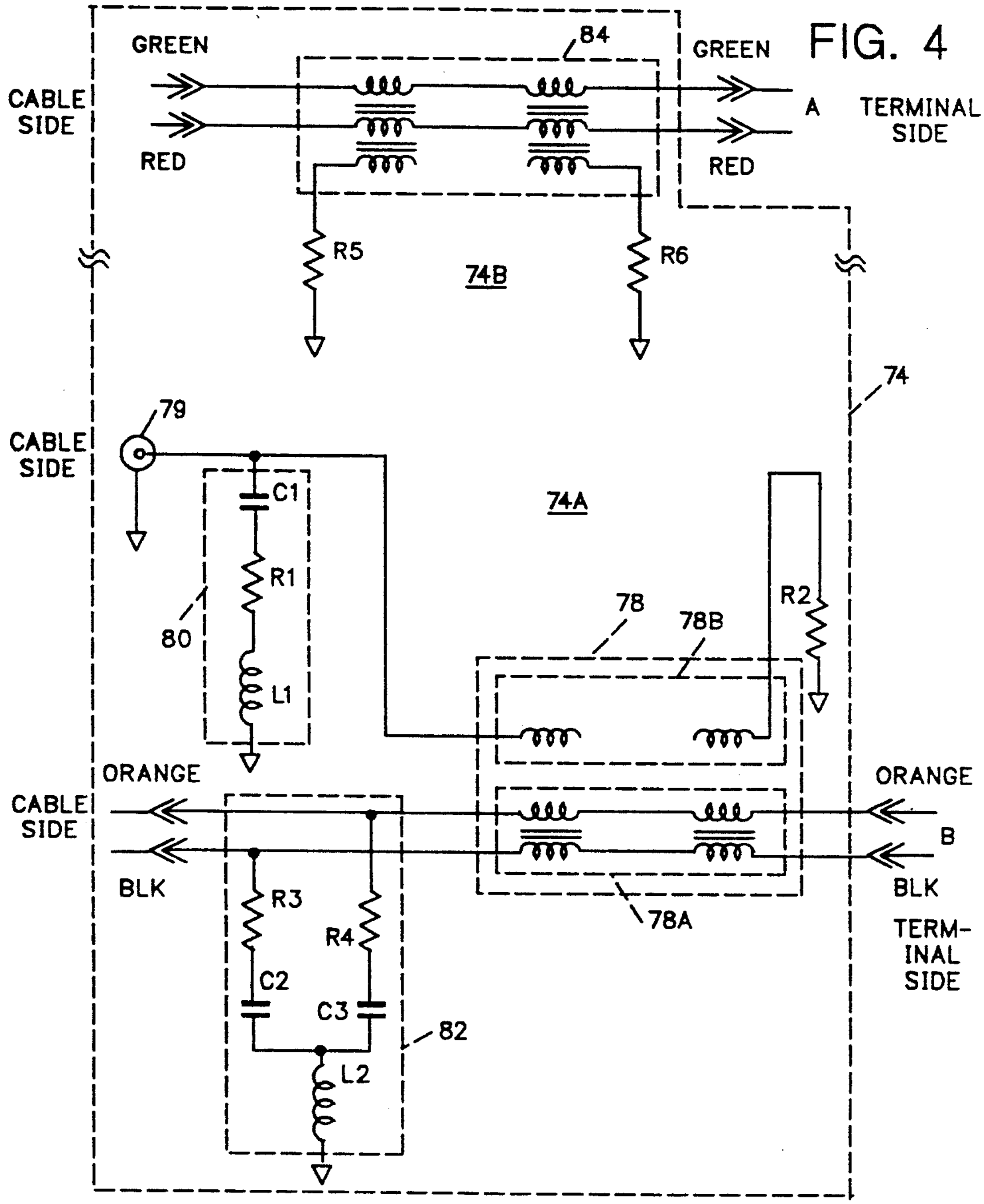
FIG. 4 shows a circuit diagram of the F-coupler.

FIG. 4 shows a circuit diagram for the F-coupler. The F-coupler may be considered as having an internal electrical structure identified by numeral 74 and external ports called terminal side and cable side. The terminal side of the F-coupler is the side to which a data terminal equipment such as a personal computer, word processor, etc., is attached. In addition, the terminal side has an A terminal through which data from the cable port of the F-coupler is passed to the terminal. The arrow shows the direction of signal travel and a B port to which data (baseband signal) is passed from the terminal into the F-coupler. With reference to FIG. 5, the wires at the A port and B port of the terminal side in FIG. 4, are connected to the barrel terminals in the housing plug assembly 28. With this configuration, when the resilient contact tongues coact with similar tongues, the output from the mating connector half can be connected to a data terminal equipment. It should be noted that this is only one configuration of the F-coupler and it can be used in other ways within the communications network. Still referring to FIG. 4, the green, red, orange and black wires on the cable side of the connector would be the wires which are contained in cable 68, FIG. 5.

Still referring to FIG. 4, signal paths within the F-coupler 74 is symmetrical. As such, numeral 74A indicates one signal path and numeral 74B indicates the other signal path. Signal path 74A carries both the broadband and baseband signal. Both signals co-habitate on the conductor labeled orange and black. The broadband signal is extracted or inserted at terminal 79, while the baseband signal is inserted at port B. It should be noted that terminal 79 would be connected to the coax assembly 62 (FIG. 1, FIG. 5). Broadband transformer 78, 84 could be either one of the transformers shown and described as transformer #1, #2 in previous figures. Since both broadband and baseband signals are handled by transformer 78, the foil tape 76, FIG. 2B, would shield the transformer. It should be noted that the transformer has multiple levels of shielding and, as a result, any EMI radiation is contained.

Still referring to FIG. 4, broadband transformer 78 has three windings. The windings identified by numerals 78A pass baseband signals and block broadband signals. Likewise, the winding identified by numeral 78B extracts or inserts broadband signals. As stated previously, by cutting winding 78B and interconnecting it to a reference potential by resistor R2, extending high frequency coupling for the F-coupler. The broadband terminal 79 is connected by circuit means 80 to a reference potential. The circuit means 80 includes a capacitor C1 connected in series with resistor R1 which is connected in series with coil L1. Circuit means 80 provides broadband termination for signals within the range of from 50 to 100 megahertz and provides isolation thereafter for signals over 100 megahertz. In addition to the terminating and isolating function, circuit means 80 provides lightening protection to device connected to port 79. As stated before, this device could be one which uses broadband signals such as a television video device, etc. The RC time constant of the component in circuit means 80 provide the lightening protection. Similarly, circuit means 82 provides broadband signal termination of the cable for removal of reflections while isolating the data transmission path. Thus, baseband signals can travel through windings 78A without obstruction from the broadband signal. Circuit means 82 include resistor R4 connected in series with capacitor C3 and the combination connected in parallel with series connected resistor R3 and capacitor C2. The parallel combination is connected through inductor L2 to a reference potential which could be ground. In addition to the filtering and/or terminating function which circuit means 82 provides, it provides lightening protection to baseband devices connected to the terminal side.

Still referring to FIG. 4, transmission path 74B includes broadband transformer 84 which allows one type of signal such as baseband signal to pass to the terminal side. Resistors R6 and R5 connect the third winding of the broadband transformer 84 to a reference potential. It should be noted that the characteristic of the signals passing through the F-coupler is such that the baseband and broadband signals can co-habitate on the same wire through the same transformer. The common mode choke windings provide low, medium and high frequency filtering from Khz to Ghz. The operation and theory behind this type of transmission is set forth in the above-referenced U.S. Pat. No. 4,885,747 which is incorporated herein and can be used for any purpose.

The below Table 1 gives values for circuit components used in the F-Coupler. Other values may be used without departing from the scope or spirit of the invention.

TABLE 1

| Components | Values |
|---|---|
| R1 | 75 ohms |
| R2 | 51 ohms |
| R3 | 200 ohms |
| R4 | 200 ohms |
| R5 | 51 ohms |
| R6 | 51 ohms |
| C1 | 50 pf |
| C2 | 10 pf |
| C3 | 10 pf |
| L1 | 220 nh |
| L2 | 27 nh |

The improved F-coupler described herein provides several advantages. The multi-hole ferrite core and winding arrangement provides an excellent winding isolation, dimension stability control, balance control and good broadband signal coupling with excellent manufacturing margins. Furthermore, the common mode choke windings provide low, medium and high frequency filtering from killohertz to gigahertz, all via this single core arrangement. Manufacturing and packaging the F-coupler is made simple because of the structured components used in the package. The shielding arrangement which provides three levels of EMI protection also made this F-coupler suitable for use in any environment. The level of shieldings are provided by the copper tape on the transformer cores, the shield can and the shield housing. Finally, by the arrangement of this F-coupler, extremely high data rate greater than 100 megabits as well as high bandwidth RF greater than 800 megahertz The foregoing is considered as illustrative only of the principles of the present invention. Further, since numerous modifications and changes will readily occur to those skilled in the art, it is the intention of the inventor that the invention not be limited to the exact construction and/or operation shown and described, and, accordingly, all suitable modifications and equivalents may be resorted to falling within the scope and spirit of the invention.

While the invention has been particularly shown and described with reference to the preferred embodiment thereof, it will be understood that various changes in form and detail may be made therein without departing from the spirit and scope of the invention. What is desired to be protected by Letters patent is:

I claim:

1. An improved electrical connector comprising:
- at least one multi-media port for interconnecting to a multi-media communications network;
- at least one broadband port for interconnecting to a broadband device;
- at least one baseband port for interconnecting to a baseband device; and
- a circuit means positioned to interconnect each port; said circuit means providing a first transmission path which transmits multi-media electrical signals and a second transmission path which transmits baseband electrical signals;
- with the first transmission path including a first transformer with at least one cylindrical ferrite core with a first set of windings for coupling the baseband port to the broadband port, a first circuit means, coupling a second set of selected windings of the first transformer to a first reference voltage potential, for terminating broadband signals and protecting devices connected to the baseband port against high voltage surge and a second circuit means, interconnecting a third set of selected windings of the first transformer to the first reference voltage potential, for terminating broadband signals within a selected voltage range and protecting devices connected to the broadband port against high voltage surge, and a transmission media interconnecting the first circuit means to the multi-media port; and
- the second transmission path including a second transformer with a cylindrical core and windings thereon for interconnecting the baseband port to the multi-media port.

2. The improved electrical connector of claim 1 wherein the at least one multi-media port includes a plurality of wire connecting terminals.

3. The improved electrical connector of claim 1 wherein the at least one baseband port includes a plurality of terminals having wire connecting portions and resilient contact tongues.

4. The improved electrical connector of claim 1 wherein the broadband port includes a coaxial assembly.

5. An improved electrical connector comprising:
- at least one multi-media port for interconnecting to a multi-media communications network;
- at least one broadband port for interconnecting to a broadband device;
- at least one baseband port for interconnecting to a baseband device; and
- a circuit means positioned to interconnect each port; said circuit means providing a first transmission path which transmits multi-media electrical signals and a second transmission path which transmits baseband electrical signals;

with the first transmission path including a first transformer coupling the baseband port to the broadband port, a first circuit means, coupling selected windings of the first transformer to a first reference voltage potential, for terminating broadband signals and protecting devices connected to the baseband port against high voltage surge and a second circuit means, interconnecting selected winding of the first transformer to the first reference potential, for terminating broadband signals within a selected voltage range and protecting devices connected to the broadband port against high voltage surge, and a transmission media interconnecting the first circuit means to the multi-media port; and the second transmission path interconnecting the baseband port to the multi-media port; wherein each of the first transformer and the second transformer includes a pair of cylindrical ferrite cores joined at the periphery with a joining plane being parallel to the longitudinal axis of each ferrite core, with each ferrite core having a plurality of holes extending the length of the core and parallel to the longitudinal axis; and a plurality of wires threaded through the holes in said cores.

6. The improved electrical connector of claim 1 wherein the first circuit means includes a common node, a first series connected capacitor and resistor circuit arrangement connected to the node, a second series connected capacitor and resistor circuit connected to the node and in parallel with the first series connected capacitor and resistor circuit arrangement; and an inductor interconnecting the common node to the reference voltage potential.

7. The improved electrical connector of claim 1 wherein the second circuit means includes a capacitor, resistor and inductor connected in series.

8. An electrical connector comprising:

an insulating housing having two contiguous chambers for housing components;

an insulating terminal support block mounted within one of the two contiguous chambers;

a plurality of conductive terminals mounted in the terminal support block, with each of the plurality of conductive terminals having a wire attaching portion and a resilient contact portion for mating with like contacts in a mating connector;

a module having circuit arrangements for providing signal splitting functions, signals combining functions or lightening protection mounted in another of the two contiguous chambers; and a plurality of conductors interconnecting the module to the wire attaching portion of said plurality of conducting terminals.

9. The electrical connector of claim 8 further including an upper and lower metal conductive shield positioned inside of the insulating housing to surround internal components of said connector.

10. The electrical connector of claim 9 wherein the module includes a card; a plurality of selected electrical components mounted on said card;

a plurality of wire receiving terminals mounted on said card; a first transformer having a first set of windings with one end connected to a first set of selected electrical components on the card and another end of said first set of windings exiting from the card; a first electrical conductive means interconnecting selected ones of the wire receiving terminals to the first set of electrical components, a second set of windings interconnected to a second set of electrical components on said card; and electrical conductive means interconnecting the second set of electrical components to a broadband entry/exit port.

11. The electrical connector of claim 10 further including a second transformer having a third set of windings coupled to a third set of electrical components on the card, one end of a fourth set of windings coupled to selected ones of the wire receiving terminals and another end of said fourth set of windings exiting the card.

12. An electrical connector comprising:

(a) an insulating housing having two contiguous chambers for housing components;

(b) an insulating terminal support block mounted within one of the two contiguous chambers;

(c) a plurality of conductive terminals mounted in the terminal support block, with each of the plurality of conductive terminals having a wire attaching portion and a resilient contact portion;

(d) a module having circuit arrangements for providing signal splitting functions, signal combining functions or lightening protection functions mounted in another of the two contiguous chambers, said module including a card; a plurality of selected electrical components mounted on said card, a plurality of wire receiving terminals mounted on said card, a first transformer having a first pair of interconnected multi-holed cylindrical ferrite cores, a first set of windings threaded through the multi-holed cylindrical ferrite cores with one end of said first set of windings connected to a first set of the selected electrical components on the card and another end of said first set of windings exiting from the card; a first electrical conductive means interconnecting selected ones of the wire receiving terminals to the first set of electrical components, a second set of windings interconnecting selected ones of the wire receiving terminals to the first set of electrical components, a second set of windings interconnected to a second set of electrical components on said card; a second transformer having a second pair of interconnected multi-holed cylindrical ferrite cores and a third set of windings threaded through the second pair of interconnected multi-holed cylindrical ferrite cores; coupled to a third set of electrical components on the card, one end of a fourth set of windings threaded through the ferrite cores and coupled to selected ones of the wire receiving terminals and another end of said fourth set of windings exiting the card;

(e) a plurality of conductors interconnecting the module to the wire attaching portion of said plurality of conductive terminals; and (f) an upper and lower metal conductive shield positioned inside of the insulating housing to surround internal components of said conductor.

13. The electrical connector of claim 12 wherein at least one pair of wound interconnected multi-holed cylindrical ferrite cores is covered with a metal sheet connected to the card.

14. The electrical connector of claim 13 further including a metal shield box connected to the card to cover all components on the card.

* * * * *